US008873234B2

(12) United States Patent
Huang et al.

(10) Patent No.: US 8,873,234 B2
(45) Date of Patent: Oct. 28, 2014

(54) COMPUTER HOST WITH A ROTATABLE SOCKET MECHANISM

(71) Applicant: Quanta Computer Inc., Tao Yuan Shien (TW)

(72) Inventors: Po-Hsien Huang, Tao Yuan Shien (TW); Chia-Hsiang Chiu, Tao Yuan Shien (TW); Wei-Cheng Huang, Tao Yuan Shien (TW); Hsien-Ching Tasi, Tao Yuan Shien (TW); Hung-Hsuan Su, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 122 days.

(21) Appl. No.: 13/666,465

(22) Filed: Nov. 1, 2012

(65) Prior Publication Data

US 2014/0022726 A1    Jan. 23, 2014

(30) Foreign Application Priority Data

Jul. 18, 2012    (TW) .............................. 101125737 A

(51) Int. Cl.
*H05K 5/00*    (2006.01)
*H05K 7/00*    (2006.01)
*G06F 1/16*    (2006.01)

(52) U.S. Cl.
USPC .............. 361/679.55; 361/679.45; 361/679.4; 439/11; 439/13; 439/31; 439/131

(58) Field of Classification Search
USPC .............. 361/679.4, 679.45, 679.55, 679.56, 361/679.6; 439/11, 13, 31, 131
See application file for complete search history.

(56) References Cited

U.S. PATENT DOCUMENTS

| | | | |
|---|---|---|---|
| 6,676,420 B1 * | 1/2004 | Liu et al. ...................... | 439/131 |
| 7,200,002 B2 * | 4/2007 | Peng et al. ................. | 361/679.4 |
| 8,189,101 B2 * | 5/2012 | Cummings et al. ........... | 348/376 |
| 8,274,786 B2 * | 9/2012 | Sapper et al. .............. | 361/679.4 |
| 2011/0096483 A1 * | 4/2011 | Sapper et al. ............ | 361/679.02 |

FOREIGN PATENT DOCUMENTS

TW    580156    3/2004

OTHER PUBLICATIONS

Taiwanese language office action dated Jun. 20, 2014.
English language translation of abstract of TW 580156 (published Mar. 11, 2004).

* cited by examiner

*Primary Examiner* — Anthony Haughton
(74) *Attorney, Agent, or Firm* — McClure, Qualey & Rodack, LLP

(57) ABSTRACT

A host for a portable computer is disclosed. A main board is disposed in a casing. A socket mechanism is rotatably disposed in the casing, is electrically connected to the main board, and detachably connects to an electronic device. The electronic device protrudes to the exterior of the casing when the socket mechanism rotates to a first position. The electronic device is received in the casing when the socket mechanism rotates to a second position.

8 Claims, 5 Drawing Sheets

COMPUTER HOST WITH A ROTATABLE SOCKET MECHANISM

CROSS REFERENCE TO RELATED APPLICATIONS

This Application claims priority of Taiwan Patent Application No. 101125737, filed on Jul. 18, 2012, the entirety of which is incorporated by reference herein.

BACKGROUND OF THE INVENTION

1. Field of the Invention

The invention relates to a host for a portable computer, and more particularly to a host that can conceal and accommodate a USB device.

2. Description of the Related Art

A USB (Universal Serial Bus) flash drive is commonly used to transfer or exchange digital information. Although providing a light weight and a small size, the USB flash drive is easily lost or forgotten to be carried by a user.

Moreover, when the USB flash drive is inserted into a laptop or a portable computer, most of the USB flash drive protrudes from the portable computer. Accordingly, the USB flash drive protruding to the exterior of the portable computer is easily damaged due to external impacts or collisions. Additionally, when the portable computer is operated on a desk, the USB flash drive protruding to the exterior of the portable computer occupies a certain space of the desk. Furthermore, portability and storage of the portable computer with the USB flash drive inserted therein is inconvenient.

Hence, there is a need for a host for a portable computer, with functions of concealing and accommodating a USB device.

BRIEF SUMMARY OF THE INVENTION

A detailed description is given in the following embodiments with reference to the accompanying drawings.

An exemplary embodiment of the invention provides a host for a portable computer, comprising a casing, a main board, and a socket mechanism. The main board is disposed in the casing. The socket mechanism is rotatably disposed in the casing, is electrically connected to the main board, and detachably connects to an electronic device. The electronic device protrudes to the exterior of the casing when the socket mechanism rotates to a first position. The electronic device is received in the casing when the socket mechanism rotates to a second position.

The host further comprises a positioning member movably connected to the casing. The socket mechanism comprises a first positioning recessed groove and a second positioning recessed groove separated from the first positioning recessed groove by a predetermined angle. The positioning member is engaged in the first positioning recessed groove when the socket mechanism rotates to the first position. The positioning member is engaged in the second positioning recessed groove when the socket mechanism rotates to the second position.

The host further comprises a restoring spring connected between the casing and the positioning member, restoring the positioning member.

The host further comprises a first torsion spring connected between the casing and the socket mechanism.

The host further comprises a side cover rotatably connected to the casing. The side cover is opened from the casing when the socket mechanism rotates to the first position. The side cover is closed to the casing when the socket mechanism rotates to the second position.

The host further comprises a second torsion spring connected between the casing and the side cover.

The socket mechanism is electrically connected to the main board through a flexible flat cable.

The socket mechanism further comprises a circuit board on which the first and second positioning recessed grooves are formed.

The circuit board is electrically connected to the main board through a flexible flat cable.

The socket mechanism comprises a USB socket mechanism, a Thunderbolt socket mechanism, an IEEE 1394 socket mechanism, or an External Serial ATA socket mechanism.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
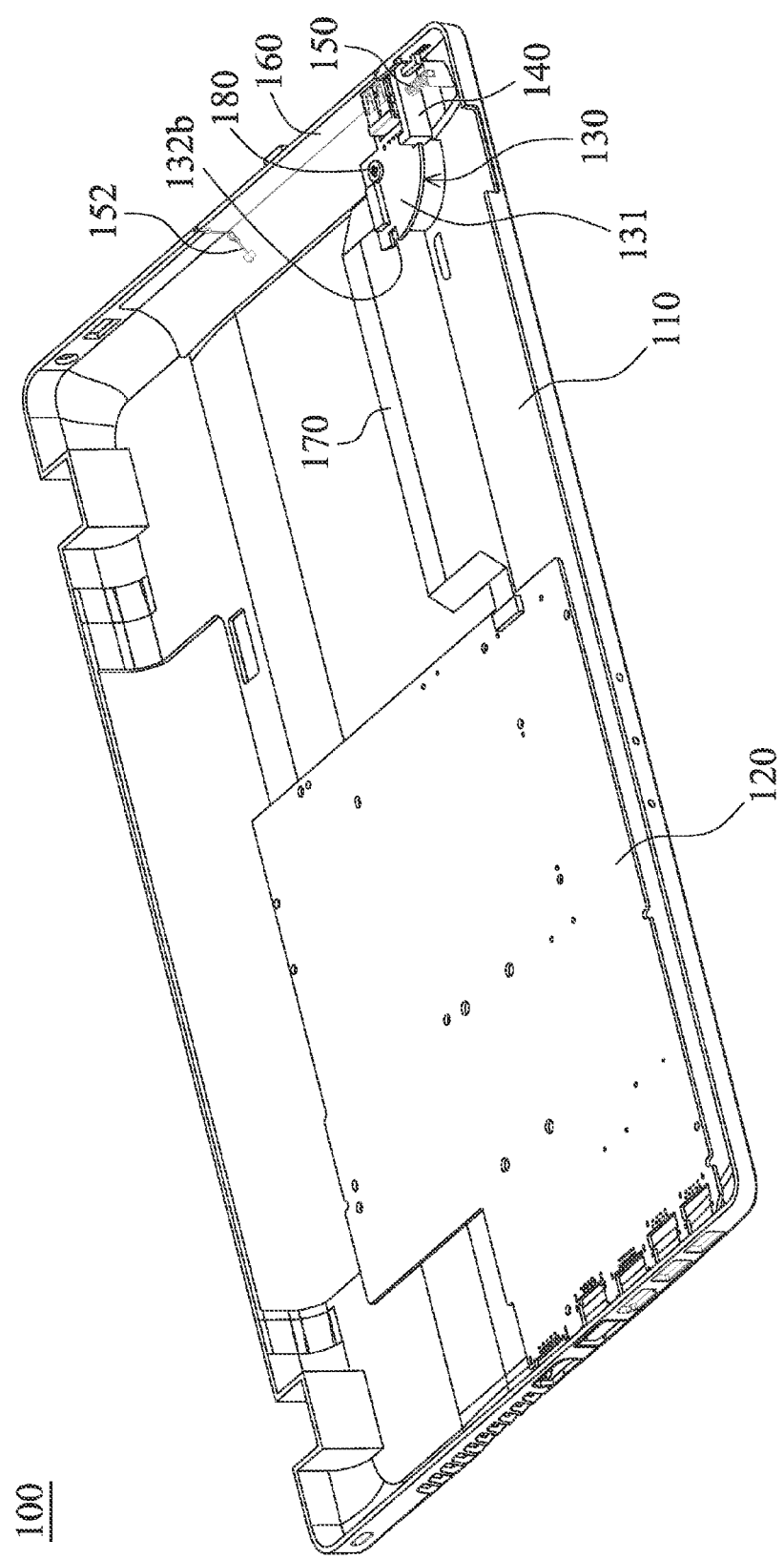
FIG. 1A is a perspective assembly view of a host, for a portable computer, of the invention.
Figure 1B:
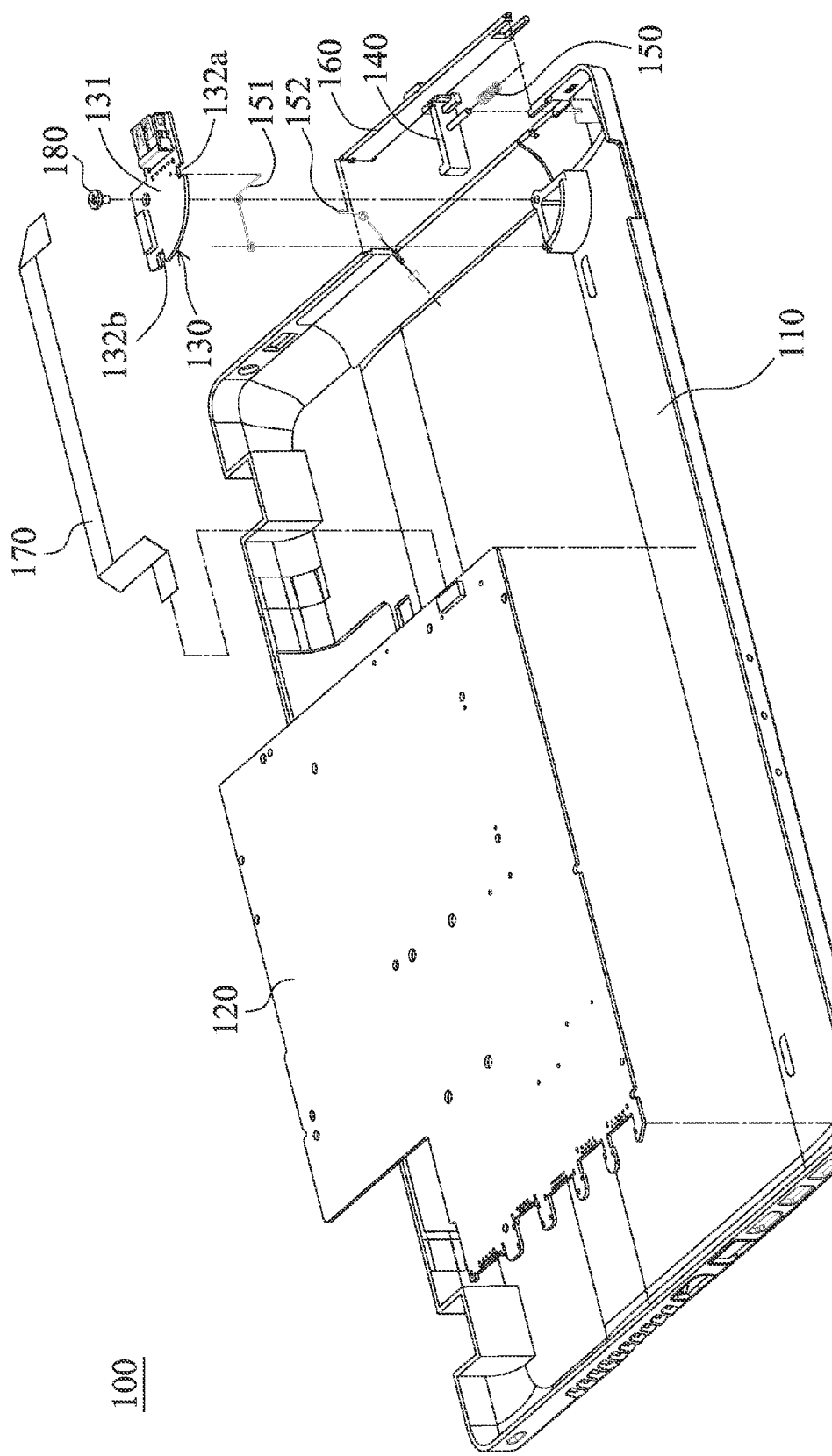
FIG. 1B is an exploded perspective view of the host, for a portable computer, of the invention.

Referring to FIG. 1A and FIG. 1B, a host 100 for a portable computer comprises a casing 110, a main board 120, a socket mechanism 130, a positioning member 140, a restoring spring 150, a first torsion spring 151, a side cover 160, and a second torsion spring 152.

The main board 120 is disposed in the casing 110.

The socket mechanism 130 may be a USB (Universal Serial Bus) socket mechanism, a Thunderbolt socket mechanism, an IEEE 1394 (FireWire) socket mechanism, or an External Serial ATA (eSATA) socket mechanism. In this embodiment, the socket mechanism 130 is illustrated with the USB (Universal Serial Bus) socket mechanism, for example.

As shown in FIGS. 1A, 1B, 2, 3, and 4, the USB socket mechanism 130 is rotatably disposed in the casing 110 and is electrically connected to the main board 120 through a flexible flat cable (FFC) 170. Here, the USB socket mechanism 130 detachably connects to an electronic device, such as a USB device A. Namely, the USB device A is plugged into the USB socket mechanism 130. Specifically, the USB socket mechanism 130 is rotatably disposed in the casing 110 by a pivot 180 and comprises a circuit board 131, a first positioning recessed groove 132a, and a second positioning recessed groove 132b. The first positioning recessed groove 132a and second positioning recessed groove 132b are formed on the circuit board 131 and are separated from each other by a predetermined angle. In this embodiment, the predetermined angle is 90° and is not limited thereto. Moreover, the flexible flat cable 170 is connected between the circuit board 131 and the main board 120, transmitting digital information between the main board 120 and the USB device A (e.g. a USB flash drive). Additionally, as shown in FIG. 1B, the first torsion spring 151 is connected between the casing 110 and the USB socket mechanism 130. Namely, one end of the first torsion spring 151 is connected to the casing 110 and the other end thereof is connected to the USB socket mechanism 130.

As shown in FIGS. 1A, 1B, 2, 3, and 4, the positioning member 140 is movably connected to one side of the casing 110 and is selectively (or detachably) engaged in one of the first positioning recessed groove 132a and second positioning recessed groove 132b.

The restoring spring 150 is connected between the casing 110 and the positioning member 140, used for restoring the positioning member 140.

The side cover 160 is rotatably connected to the casing 110. Here, the side cover 160 can selectively be opened from the casing 110 or closed to the casing 110.

The second torsion spring 152 is connected between the casing 110 and the side cover 160. Namely, one end of the second torsion spring 152 is connected to the casing 110 and the other end thereof is connected to the side cover 160.

The following description is directed to operation between the host 100 and the USB device A.

Before the USB device A is plugged into the USB socket mechanism 130, the side cover 160 can be rotated from the casing 110 to expose the USB socket mechanism 130. At this point, the second torsion spring 152 connected between the casing 110 and the side cover 160 is provided with restoring resilience.

Figure 2:
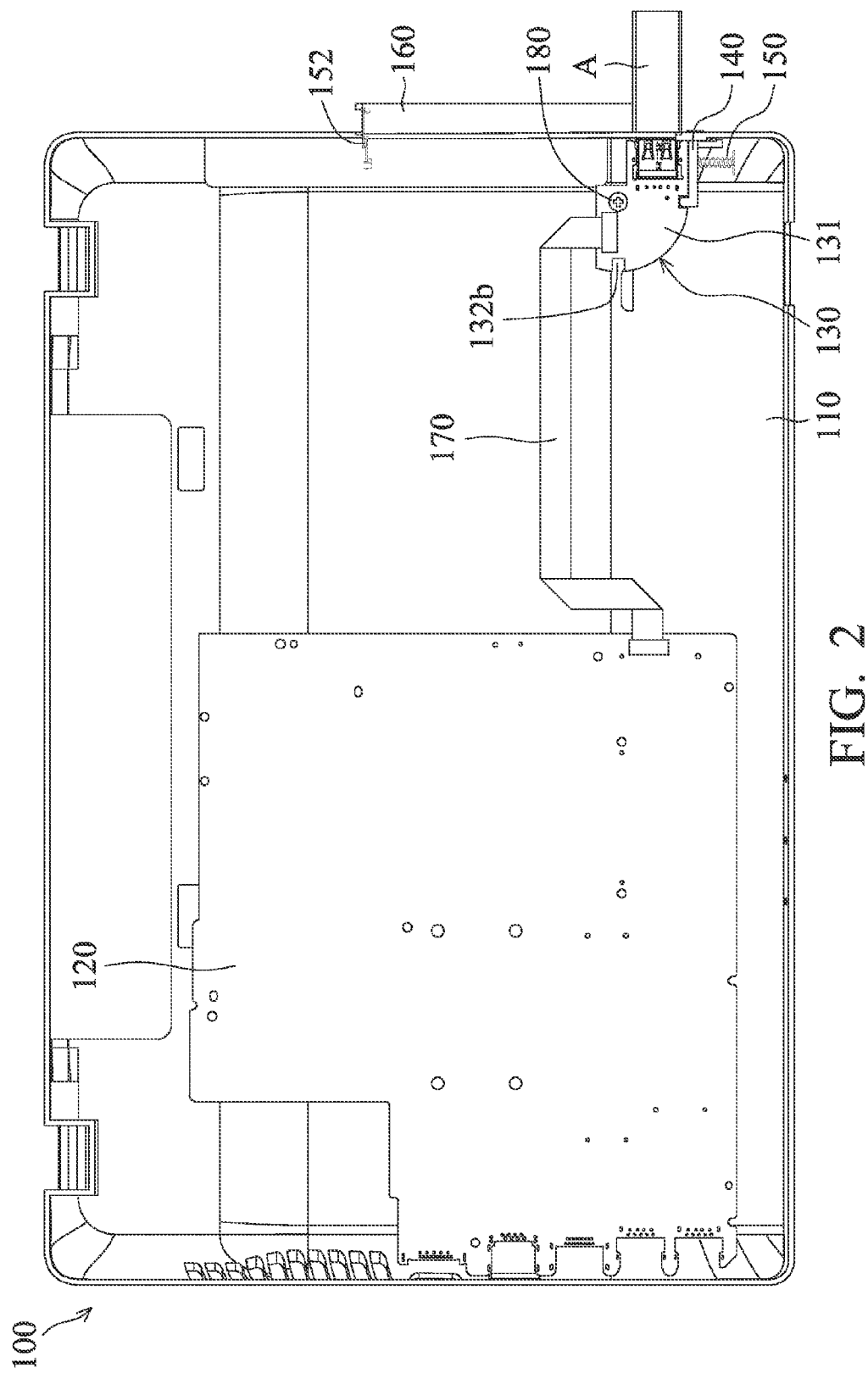
FIG. 2 is a schematic plane view of the host of the invention in an operational mode.

Next, as shown in FIG. 2, when the USB socket mechanism 130 is disposed in or rotated to a first position, the USB device A can be plugged into the USB socket mechanism 130. Here, as the positioning member 140 is persistently engaged in the first positioning recessed groove 132a of the USB socket mechanism 130, the USB device A can be fixed in the first position for use. At this point, the USB device A protrudes to the exterior of the casing 110.

Figure 3:
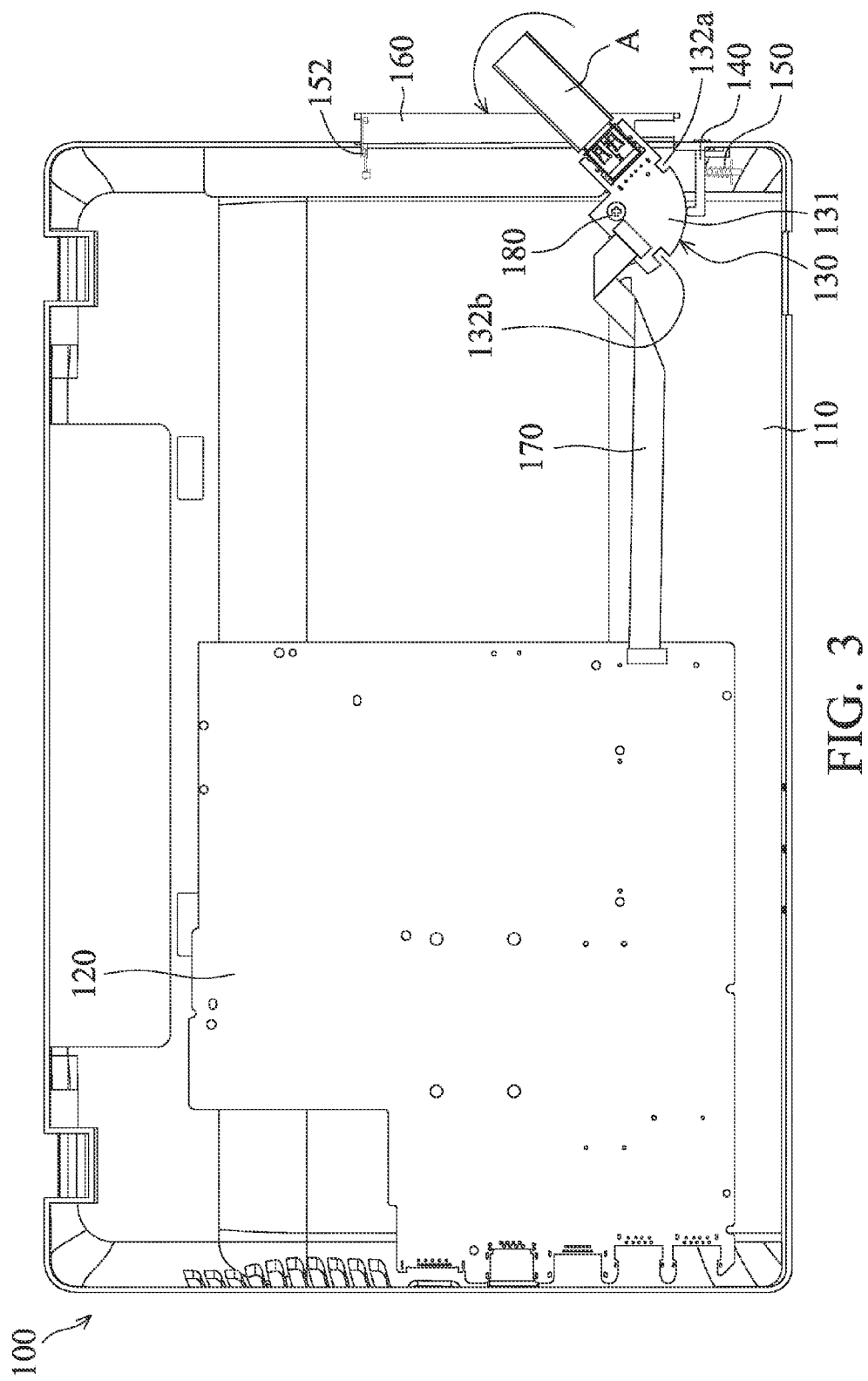
FIG. 3 is a schematic plane view of the host of the invention in another operational mode.

When the USB device A is received in the casing 110, the positioning member 140 is moved (backward), enabling the positioning member 140 to disengage from the first positioning recessed groove 132a of the USB socket mechanism 130. At this point, as shown in FIG. 3, the restoring spring 150 connected between the casing 110 and the positioning member 140 is provided with the restoring resilience, and the USB socket mechanism 130 can be rotated toward the interior of the casing 110 by the restoring resilience provided by the first torsion spring 151.

In an embodiment, through the pivot 180, the USB socket mechanism 130 can be rotated toward the interior of the casing 110, and at that point the first torsion spring 151 connected between the casing 110 and the USB socket mechanism 130 is provided with the restoring resilience.

Figure 4:
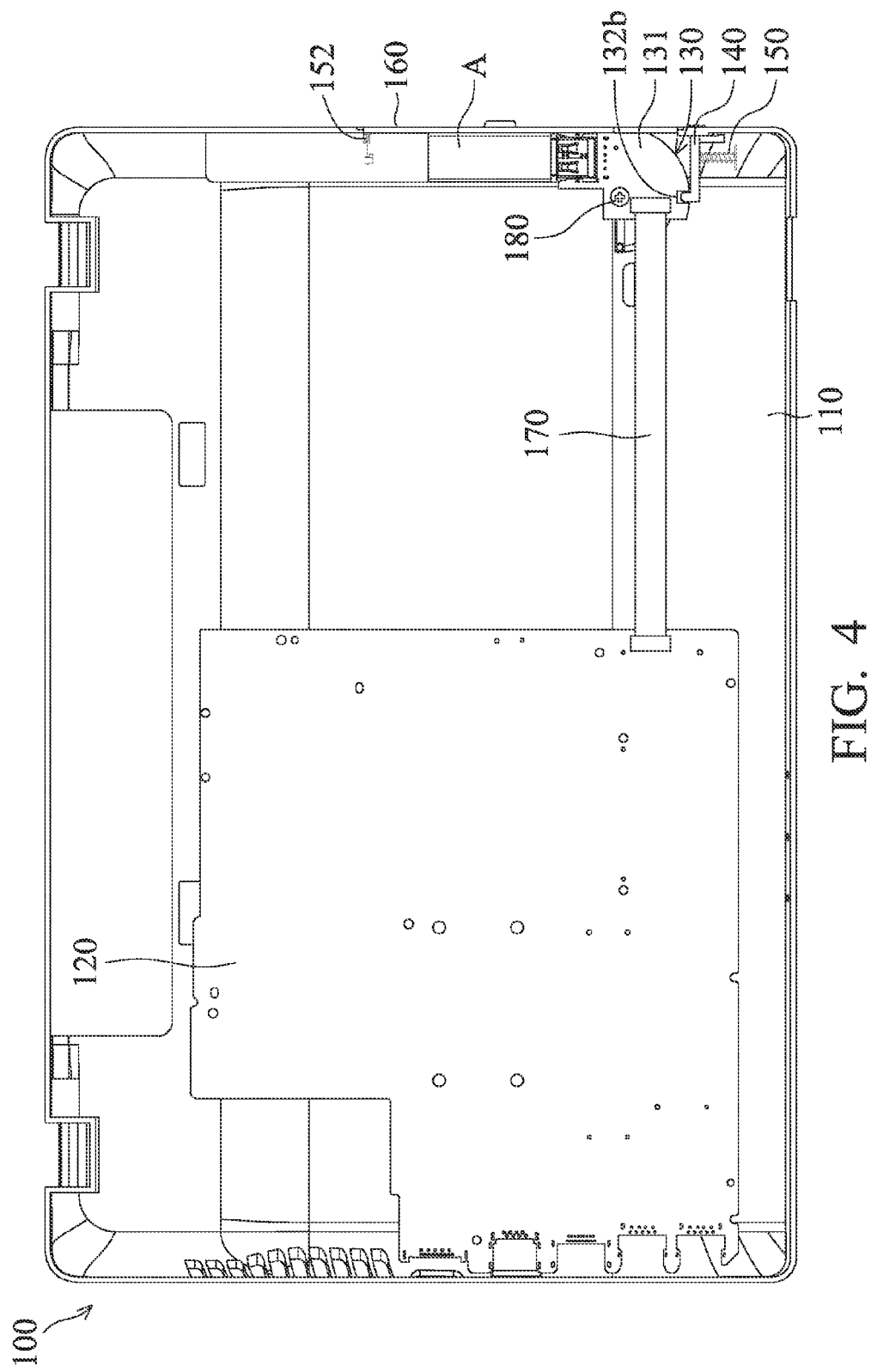
FIG. 4 is a schematic plane view of the host of the invention in yet another operational mode.

Next, as shown in FIG. 4, when the USB socket mechanism 130 is rotated to a second position, the positioning member 140 is moved (forward) to be engaged in the second positioning recessed groove 132b of the USB socket mechanism 130 by the restoring resilience provided by the restoring spring 150, thereby fixing the USB device A in the second position for use. At the same time, the side cover 160 is rotated to cover the USB socket mechanism 130 by the restoring resilience provided by the second torsion spring 152. At this point, the operation for accommodating the USB device A in the casing 110 is complete. Specifically, as the USB device A received in the casing 110 is covered by the side cover 160, the overall aesthetic appearance of the host 100 is not adversely affected.

Moreover, when the USB device A needs to again protrude to the exterior of the casing 110 for use, the side cover 160 is rotated from the casing 110 to expose the USB socket mechanism 130 and the positioning member 140 is moved (backward) to disengage from the second positioning recessed groove 132b of the USB socket mechanism 130. The USB socket mechanism 130 or USB device A is then rotated to the first position (by the restoring resilience provided by the first torsion spring 151) and the positioning member 140 is moved (forward) to be again engaged in the first positioning recessed groove 132a of the USB socket mechanism 130. At this point, the operation for again protruding the USB device A to the exterior of the casing 110 is complete.

In conclusion, the disclosed host has the following advantages. Damage to the protruding USB device caused by external impacts or collisions can be avoided. Moreover, the disclosed host does not take additional space required for placing the USB device on a desk. Additionally, portability and storage of the USB device can be enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A host for a portable computer, comprising:
a casing;
a main board disposed in the casing;
a socket mechanism rotatably disposed in the casing, electrically connected to the main board, and detachably connecting to an electronic device, wherein the socket mechanism comprises a circuit board, and a first positioning recessed groove and a second positioning recessed groove separated from the first positioning recessed groove by a predetermined angle are formed on the circuit board; and
a positioning member connected to the casing and arranged moved back and forth relative to the socket mechanism;
arranged such that the electronic device protrudes to the exterior of the casing and the positioning member is engaged in the first positioning recessed groove when the socket mechanism rotates to a first position, and the electronic device is received in the casing and the positioning member is engaged in the second positioning recessed groove when the socket mechanism rotates to a second position.

2. The host for a portable computer as claimed in claim 1, further comprising a restoring spring connected between the casing and the positioning member, restoring the positioning member.

3. The host for a portable computer as claimed in claim 1, further comprising a first torsion spring connected between the casing and the socket mechanism.

4. The host for a portable computer as claimed in claim 1, further comprising a side cover rotatably connected to the casing, wherein the side cover is rotated from the casing to expose the socket mechanism when the socket mechanism rotates to the first position, and the side cover is rotated to cover the socket mechanism when the socket mechanism rotates to the second position.

5. The host for a portable computer as claimed in claim 4, further comprising a second torsion spring connected between the casing and the side cover.

6. The host for a portable computer as claimed in claim 1, wherein the socket mechanism is electrically connected to the main board through a flexible flat cable.

7. The host for a portable computer as claimed in claim 1, wherein the circuit board is electrically connected to the main board through a flexible flat cable.

8. The host for a portable computer as claimed in claim 1, wherein the socket mechanism comprises a USB socket mechanism, a Thunderbolt socket mechanism, an IEEE 1394 socket mechanism, or an External Serial ATA socket mechanism.

* * * * *